United States Patent
Yu et al.

(10) Patent No.: US 11,186,300 B2
(45) Date of Patent: Nov. 30, 2021

(54) COLLISION ENERGY ABSORPTION STRUCTURE AND RAIL VEHICLE HAVING SAME

(71) Applicant: CRRC QINGDAO SIFANG CO., LTD., Qingdao (CN)

(72) Inventors: Haiyang Yu, Qingdao (CN); Yuwen Liu, Qingdao (CN); Aiqin Tian, Qingdao (CN); Honglei Tian, Qingdao (CN); Yangyang Yu, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 473 days.

(21) Appl. No.: 16/303,784

(22) PCT Filed: Sep. 29, 2018

(86) PCT No.: PCT/CN2018/108714
§ 371 (c)(1),
(2) Date: Nov. 21, 2018

(87) PCT Pub. No.: WO2020/047924
PCT Pub. Date: Mar. 12, 2020

(65) Prior Publication Data
US 2021/0221413 A1 Jul. 22, 2021

(30) Foreign Application Priority Data
Sep. 6, 2018 (CN) .......................... 201811039092.9

(51) Int. Cl.
*B61F 19/04* (2006.01)
*B61F 1/10* (2006.01)

(52) U.S. Cl.
CPC ............... *B61F 19/04* (2013.01); *B61F 1/10* (2013.01)

(58) Field of Classification Search
CPC . B61D 15/06; B61F 1/10; B61F 19/04; B61G 11/00; B61G 11/10; B61G 11/12; B61G 11/14; B61G 11/16
See application file for complete search history.

(56) References Cited

U.S. PATENT DOCUMENTS 6,263,805 B1 7/2001 Taguchi

FOREIGN PATENT DOCUMENTS

CN 101932487 A 12/2010
CN 202935363 U 5/2013
(Continued)

OTHER PUBLICATIONS

International Search Report for corresponding application PCT/CN2018/108714 Report dated May 29, 2019.

*Primary Examiner* — Robert J McGarry, Jr.
(74) *Attorney, Agent, or Firm* — Cantor Colburn LLP

(57) ABSTRACT

Provided are a collision energy absorption structure and a rail vehicle having the same. The collision energy absorption structure includes: a primary energy absorption structure, connected to a chassis boundary beam of a vehicle, the primary energy absorption structure having at least two spaced energy absorption cavities; an end energy absorption structure, the lower end of the end energy absorption structure being connected to the primary energy absorption structure; and a roof structure, the upper end of the end energy absorption structure being connected to the roof structure. The technical solution provided by the present invention can meet requirements of more complex road conditions.

19 Claims, 7 Drawing Sheets

(56) References Cited

FOREIGN PATENT DOCUMENTS

| | | |
|---|---|---|
| CN | 103909948 A | 7/2014 |
| CN | 204341081 U | 5/2015 |
| CN | 206159340 U | 5/2017 |
| CN | 107614351 A | 1/2018 |
| CN | 207345836 U | 5/2018 |
| CN | 207631268 U | 7/2018 |
| CN | 109382552 A | 2/2019 |
| EP | 1223095 A1 * | 7/2002 ........... B62D 21/152 |
| EP | 1223095 A1 | 7/2002 |
| EP | 3181425 A1 | 6/2021 |
| JP | 1159415 A | 3/1999 |
| JP | 201869944 A | 5/2018 |

\* cited by examiner

COLLISION ENERGY ABSORPTION STRUCTURE AND RAIL VEHICLE HAVING SAME

TECHNICAL FIELD

The present invention relates to the technical field of rail vehicles, and in particular to a collision energy absorption structure and a rail vehicle having the same.

BACKGROUND

With the high-speed development of the fields of rail transits, the running safety issues have been valued by people increasingly while making travel convenient. Rail transit vehicles such as a subway are usually large in passenger capacity and high in running speed, and once a collision accident happens, serious personnel casualties and property losses will be caused. Recent train rear-ended accidents fully show that train collision accidents cannot be completely avoided even through a series of measures are taken in terms of signal control, scheduling management and programming management. In this case, the performance of a passive safety protection device serving as an ultimate guardian for passenger life and property safety is particularly important.

Statistics show that rail transit vehicles need to absorb a large energy in the collision process, and therefore the collision performance of an energy absorption member of a rail vehicle is an important indicator for quality measurement. With the continuous acceleration of rail transit vehicles, the collision performance of the energy absorption member is highly required. The collision performance of the energy absorption member of the rail vehicle cannot meet current demands in the related art.

In addition, under some special working conditions, vehicle end couplings are required to have a small gap and allow a small curve negotiation. Under these requirements, once the collision energy absorption requirement for the vehicle is improved, a collision energy absorption structure design for the vehicle needs to be added, the size of the energy absorption structure needs to be increased to increase the size of a vehicle end, and therefore it is difficult to meet the demand of a small curve negotiation. A technical solution for solving the complex road conditions has not been found yet for this case.

SUMMARY

The present invention provides a collision energy absorption structure and a rail vehicle having the same, intended to solve the problem in the conventional art in which a collision energy absorption structure of an energy absorption member of a rail vehicle cannot meet requirements of complex road conditions.

In order to solve the above problem, according to an aspect of the present invention, the present invention provides a collision energy absorption structure. The collision energy absorption structure includes: a primary energy absorption structure, connected to a chassis boundary beam of a vehicle, the primary energy absorption structure having at least two spaced energy absorption cavities; an end energy absorption structure, the lower end of the end energy absorption structure being connected to the primary energy absorption structure; and a roof structure, the upper end of the end energy absorption structure being connected to the roof structure.

Further, the primary energy absorption structure comprises an end beam, two ends of the end beam are connected to a chassis boundary beam of the vehicle respectively, the end beam has an end beam bottom plate and an end beam vertical plate connected to the end beam bottom plate, and the end beam vertical plate is vertically disposed and defines the energy absorption cavity on the end beam bottom plate.

Further, the end energy absorption structure comprises a first energy absorption cylinder, the middle of the end beam bottom plate is provided with a first cylinder mounting hole a, and the first energy absorption cylinder penetrates into the first cylinder mounting hole a and is welded to the end beam bottom plate.

Further, the end beam bottom plate comprises a first bottom plate and a second bottom plate disposed oppositely, and the first energy absorption cylinder is welded to the first bottom plate and the second bottom plate respectively.

Further, the end energy absorption structure further comprises a second energy absorption cylinder, having a first end welded to the roof structure and a second end welded to the primary energy absorption structure.

Further, there are two second energy absorption cylinders, the two second energy absorption cylinders being spaced; and there are two first energy absorption cylinders, the two first energy absorption cylinders being spaced, and the two first energy absorption cylinders being located between the two second energy absorption cylinders.

Further, two ends of the end beam bottom plate are separately provided with a second cylinder mounting hole, and the second energy absorption cylinder penetrates into the second cylinder mounting hole and is welded to the end beam bottom plate.

Further, the collision energy absorption structure further comprises a secondary energy absorption structure, the secondary energy absorption structure being connected to the primary energy absorption structure, the secondary energy absorption structure comprising at least two spaced energy absorption tubes and the primary energy absorption structure being connected to a first end of the energy absorption tube.

Further, the energy absorption tube is a hollow structure, the energy absorption tube is provided with a first induction portion.

Further, the first induction portion comprises an induction hole, and the induction hole is a through hole.

Further, the cross section of the energy absorption tube is rectangular, the first induction portion comprises at least one group of induction holes, and the induction holes of each group is spaced in the circumferential direction of the energy absorption tube along a plane vertical to the axis of the energy absorption tube.

Further, the first induction portion comprises a plurality of groups of induction holes, the plurality of groups of induction holes being spaced along an extending direction of the energy absorption tube.

Further, the energy absorption tube comprises at least two adjacent side walls, the two adjacent side walls are connected to form a bending portion, and the first induction portion is disposed on at least one bending portion of the energy absorption tube.

Further, the energy absorption tube is also provided with a second induction portion, the second induction portion being disposed on a side wall of the energy absorption tube.

Further, the second induction portion is depressed into the side wall of the energy absorption tube to form a depression portion.

Further, the cross section of the energy absorption tube is rectangular, there are two second induction portions, and the two second induction portions are disposed on the side walls of the energy absorption tube oppositely.

Further, the collision energy absorption structure comprising a tertiary energy absorption structure, wherein the tertiary energy absorption structure is connected to a second end of the energy absorption tube.

Further, the tertiary energy absorption structure comprises a stopping beam, and two ends of the stopping beam are connected to the chassis boundary beam of the rail vehicle respectively.

Further, the second end of the energy absorption tube is connected to the stopping beam.

Further, the stopping beam comprises a first stopping segment, a second stopping segment and a third stopping segment connected in sequence, the second end of the energy absorption tube is welded to the second stopping segment, a first included angle is provided between the first stopping segment and the second stopping segment, the first included angle is an obtuse angle, a second included angle is provided between the third stopping segment and the second stopping segment, and the first included angle is equal to the second included angle.

Further, the first stopping segment is provided with a plurality of spaced second weight-reducing holes; and/or, the third stopping segment is provided with a plurality of spaced third weight-reducing holes.

According to another aspect of the present invention, a rail vehicle is provided. The rail vehicle includes a collision energy absorption structure, wherein the collision energy absorption structure is the collision energy absorption structure according to any one of the above contents.

According to the technical solution of the present invention, a primary energy absorption structure on an end chassis, a roof structure, and an end energy absorption structure mounted between the roof structure and the primary energy absorption structure form an end integrated energy absorption structure of a vehicle body structure, and an independent energy absorption structure element is no longer needed. The present invention improves the collision energy absorption performance of a vehicle without increasing the external dimension of the vehicle body structure. Since the external dimension of the vehicle is not increased, the collision energy absorption structure of the present invention can meet the technical requirements of small gap between vehicle end couplings and small curve negotiation and can meet more requirements of complex road conditions.

BRIEF DESCRIPTION OF THE DRAWINGS

The accompanying drawings, which constitute a part of this application, are used to provide a further understanding of the present invention, and the exemplary embodiments of the present invention and the description thereof are used to explain the present invention, but do not constitute improper limitations to the present invention. In the drawings.

Figure 1:
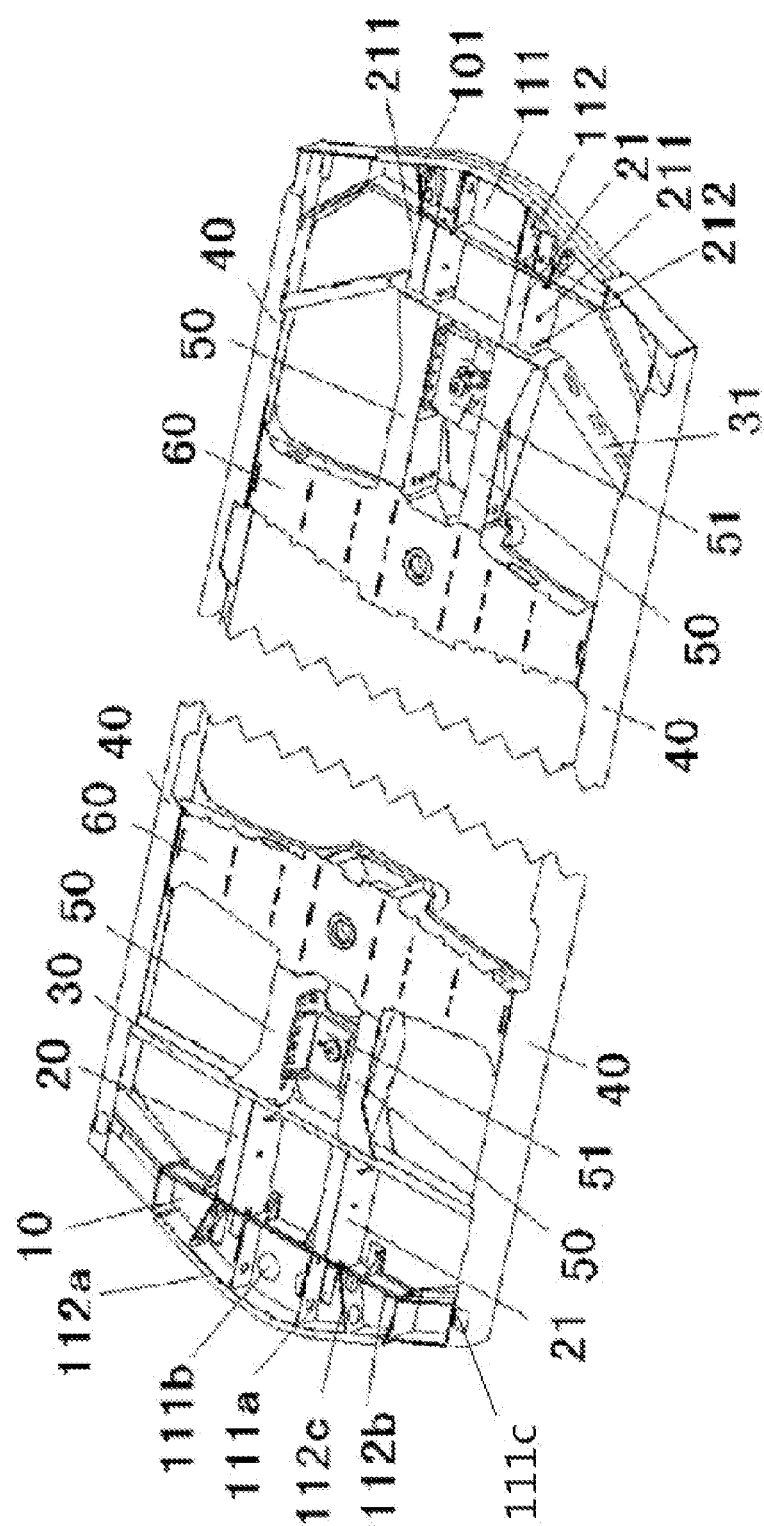
FIG. 1 illustrates a first structure diagram of a collision energy absorption structure according to the present invention.

The drawings include the following reference signs:
- 10: primary energy absorption structure; 11: end beam; 111: end beam bottom plate; 112: end beam vertical plate; 111a: first cylinder mounting hole; 111b: vehicle hook mounting hole; 111c: second cylinder mounting hole; 112a: first edge vertical plate; 112b: second edge vertical plate; 112c: middle vertical plate; 101: anti-creeping tooth;
- 20: secondary energy absorption structure; 21: energy absorption tube; 211: induction hole; 212: depression portion; 213: first induction portion; 214: first tube body portion; 215: second tube body portion; 216: second induction portion;
- 30: tertiary energy absorption structure; 31: stopping beam;
- 40: chassis boundary beam;
- 50: traction beam; 51: vehicle hook mounting seat;
- 60: sleeper beam;
- 70: side wall;
- 80: end energy absorption structure; 81: first energy absorption cylinder; 82: second energy absorption cylinder;
- 90: roof structure.

DETAILED DESCRIPTION OF THE EMBODIMENTS

The technical solutions in the embodiments of the present invention will be clearly and completely described herein below with the drawings in the embodiments of the present invention. It is apparent that the described embodiments are only part of the embodiments of the present invention, not all of the embodiments. The following description of at least one exemplary embodiment is only illustrative actually, and is not used as any limitation for the present invention and the application or use thereof. On the basis of the embodiments of the present invention, all other embodiments obtained on the premise of no creative work of those of ordinary skill in the art fall within the scope of protection of the present invention.

As shown in FIG. 1 to FIG. 9, an embodiment of the present invention provides a collision energy absorption structure. The collision energy absorption structure mainly includes: a primary energy absorption structure 10, connected to a chassis boundary beam 40 of a vehicle, the primary energy absorption structure 10 having at least two spaced energy absorption cavities; an end energy absorption structure 80, the lower end of the end energy absorption structure 80 being connected to the primary energy absorption structure 10; and a roof structure 90, the upper end of the end energy absorption structure 80 being connected to the roof structure 90.

In the present invention, the primary energy absorption structure 10 on an end chassis, the roof structure 90 and the end energy absorption structure 80 mounted between the roof structure 90 and the primary energy absorption structure 10 form an end integrated energy absorption structure of a vehicle body structure, and an independent energy absorption structure element is no longer needed. The present invention improves the collision energy absorption performance of a vehicle without increasing the external dimension of the vehicle body structure, and meets the requirements for collision energy absorption of a vehicle body structure. In addition, since the external dimension of the vehicle body structure does not need to be changed, the dimension of the vehicle can be consistent with the existing vehicle, so that the requirements for a vehicle compatible with couplings can be met, and the compatibility of the vehicle is improved. Since the external dimension of the vehicle is not increased, the collision energy absorption structure of the present invention can meet the technical requirements of small gap between vehicle end couplings and small curve negotiation and can adapt to more complex road conditions.

Firstly, the primary energy absorption structure 10 of the collision energy absorption structure is described.

According to an embodiment of the present invention, as shown in FIG. 1, the primary energy absorption structure 10 includes an end beam 11, two ends of the end beam 11 are connected to the chassis boundary beam 40 of the vehicle respectively, the end beam 11 has an end beam bottom plate 111 and an end beam vertical plate 112 connected to the end beam bottom plate 111, and the end beam vertical plate 112 is vertically disposed and defines the energy absorption cavity on the end beam bottom plate 111. The end beam vertical plate 112 is vertically disposed on the end beam bottom plate 111, so that the primary energy absorption structure 10 naturally forms an energy absorption cavity having an energy absorption effect, thus improving the collision performance of the rail vehicle, and guaranteeing the personal safety of people in the vehicle. That is, when the primary energy absorption structure 10 is subjected to a collision pressure in a direction reverse to the running direction of the rail vehicle, the energy absorption cavity is deformed by the pressure to absorb the collision extrusion force, thus guaranteeing the personal safety of people in the vehicle.

It is to be noted that the end beam bottom plate 111 includes a first bottom plate and a second bottom plate disposed oppositely. The end beam vertical plate 112 is vertically disposed and is connected to the end beam bottom plate 111, so as to define the energy absorption cavity on the end beam bottom plate 111. Specifically, the end beam vertical plate 112 is vertically disposed on the first bottom plate, and defines the energy absorption cavity on the first bottom plate. In addition, the second bottom plate covers the end beam vertical plate 112. That is, the end beam vertical plate 112 is vertically disposed under the second bottom plate, and defines the energy absorption cavity under the second bottom plate. That is, the energy absorption cavity is surrounded by the end beam vertical plate 112 and the end beam bottom plate 111. In the present embodiment, the first bottom plate and the second bottom plate included by the end beam bottom plate 111 are disposed above and below the energy absorption cavity respectively.

For the above energy absorption cavity, in the present embodiment, specifically as shown in FIG. 1, the end beam vertical plate 112 includes a first edge vertical plate 112a, a second edge vertical plate 112b and multiple middle vertical plates 112c, wherein the first edge vertical plate 112a and the second edge vertical plate 112b are spaced, two ends of the vertical plates 112c are connected to the first edge vertical plate 112a and the second edge vertical plate 112b respectively, the multiple middle vertical plates 112c are spaced, and multiple spaced energy absorption cavities are defined between the first edge vertical plate 112a and the second edge vertical plate 112b. The design of forming multiple energy absorption cavities by the first edge vertical plate 112a, the second edge vertical plate 112b and the multiple middle vertical plates 112c enables the primary energy absorption structure 10 to have multiple energy absorption cavities provided along the vehicle width direction of the rail vehicle, so that when being subjected to a collision extrusion force, the end beam vertical plate 112 forming multiple energy absorption cavities is inclined and deformed into the energy absorption cavities, so as to absorb collision energy. Specifically speaking, when the middle vertical plate 112c and the first edge vertical plate 112a spaced by the multiple energy absorption cavities are subjected to a collision extrusion force, a support force is provided against the collision extrusion force, and finally, the middle vertical plate 112c and the first edge vertical plate 112a are deformed to absorb the energy of the collision extrusion force.

For the above first edge vertical plate 112a, in the present embodiment, specifically as shown in FIG. 1, the first edge vertical plate 112a is connected to the tail end of one end of the chassis boundary beam 40, and the first edge vertical plate 112a is an arc-shaped structure.

It is to be noted that in the present embodiment, the collision energy absorption structure is used for improving the collision performance of a vehicle end. Therefore, the collision energy absorption structure may be disposed at any one end of a rail vehicle, that is, the collision energy absorption structure may be disposed at a first end of the rail vehicle or the collision energy absorption structure may be disposed at a second end of the rail vehicle or the collision energy absorption structure may be symmetrically disposed at the first end and the second end of the rail vehicle as shown in FIG. 1.

From the above description, it can be seen that the scenario in which the first edge vertical plate 112a is connected to the tail end of one end of the chassis boundary beam 40 includes that: the first vertical plate may be connected to the tail end of the first end of the chassis boundary beam 40, or the first vertical plate may be connected to the tail end of the second end of the chassis boundary beam 40, or the first vertical plate may be connected to the tail ends of the first end and the second end of the chassis boundary beam 40.

The first edge vertical plate 112a is disposed at a chassis end, and a first layer of vertical plate protection is formed at the chassis end. Secondly, the first edge vertical plate 112a is connected to the tail end of the chassis boundary beam 40 and connected to one end of multiple middle vertical plates 112c, thus ensuring that the first edge vertical plate 112a can disperse the collision extrusion force to the multiple middle vertical plates 112c and the chassis boundary beam 40 when the end of the rail vehicle is collided and extruded, so that the situation that the primary energy absorption structure 10 cannot steadily absorb energy due to over-concentrated applying point of the collision extrusion force is prevented.

In addition, the first edge vertical plate 112*a* is an arc-shaped structure, which has the technical effect of enhancing dispersion of the collision extrusion force. In addition, the first edge vertical plate 112*a* is designed as an arc-shaped structure, so that multiple connected rail vehicles may be prevented from colliding each other while turning.

In the present embodiment, a side, away from the energy absorption cavity, of the first edge vertical plate 112*a* may be connected with an anti-creeping tooth 101, so that the collision energy absorption structure achieves an anti-creeping effect as well. That is, when two rail vehicles collide each other, the height and tooth number of the anti-creeping teeth 101 of the two vehicles are consistent, so that when the collision occurs, the end beam 11 ensures engagement of at least one anti-creeping tooth 101, and the vehicles will not mismatch in the height direction.

It is to be noted that in order to ensure the connecting stability of the primary energy absorption structure 10 and ensure the collision performance of the primary energy absorption structure 10, the first edge vertical plate 112*a*, the second edge vertical plate 112*b*, the multiple middle vertical plates 112*c* and the end beam bottom plate 111 included in the primary energy absorption structure 10 are welded to each other. In addition, the first edge vertical plate 112*a*, the second edge vertical plate 112*b* and the chassis boundary beam 40 are also welded.

The primary energy absorption structure 10 may also be adjusted in various manners. As an optional example, at least one middle vertical plate 112*c* in the multiple middle vertical plates 112*c* is provided with a first weight-reducing hole, wherein the first weight-reducing hole is used for reducing the weight of the rail vehicle or the collision energy absorption structure.

As another optional example, the middle of the end beam bottom plate 111 is provided with a vehicle hook mounting hole 111*b* connected to a vehicle hook of the rail vehicle.

As an optional example, as shown in FIG. 1, the multiple middle vertical plates 112*c* include: two first middle vertical plates 112*c*, two second middle vertical plates 112*c* and two third middle vertical plates 112*c*, wherein the two first middle vertical plates 112*c*, the two second middle vertical plates 112*c* and the two third middle vertical plates 112*c* are symmetrically disposed along the vehicle width direction of the rail vehicle, a first energy absorption cavity is formed between the two first middle vertical plates 112*c*, a first bottom plate corresponding to the first energy absorption cavity is provided with a vehicle hook mounting hole 111*b*, a second energy absorption cavity is formed between the first middle vertical plate 112*c* and the second middle vertical plate 112*c*, the end beam bottom plate 111 corresponding to the second energy absorption cavity is provided with a first cylinder mounting hole 111*a*, a third energy absorption cavity is formed between the second middle vertical plate 112*c* and the third middle vertical plate 112*c*, and a fourth energy absorption cavity is formed between the third energy absorption cavity and the chassis boundary beam 40. In addition, the first middle vertical plate 112*c* is parallel to the third middle vertical plate 112*c*, both the first middle vertical plate 112*c* and the third middle vertical plate 112*c* are vertical to the second middle vertical plate 112*c*, and a preset angle is provided between the first middle vertical plate 112*c* and the second middle vertical plate 112*c*. In addition, both the first middle vertical plate 112*c* and the second middle vertical plate 112*c* are provided with first weight-reducing holes.

The end energy absorption structure 80 is further described.

Figure 6:
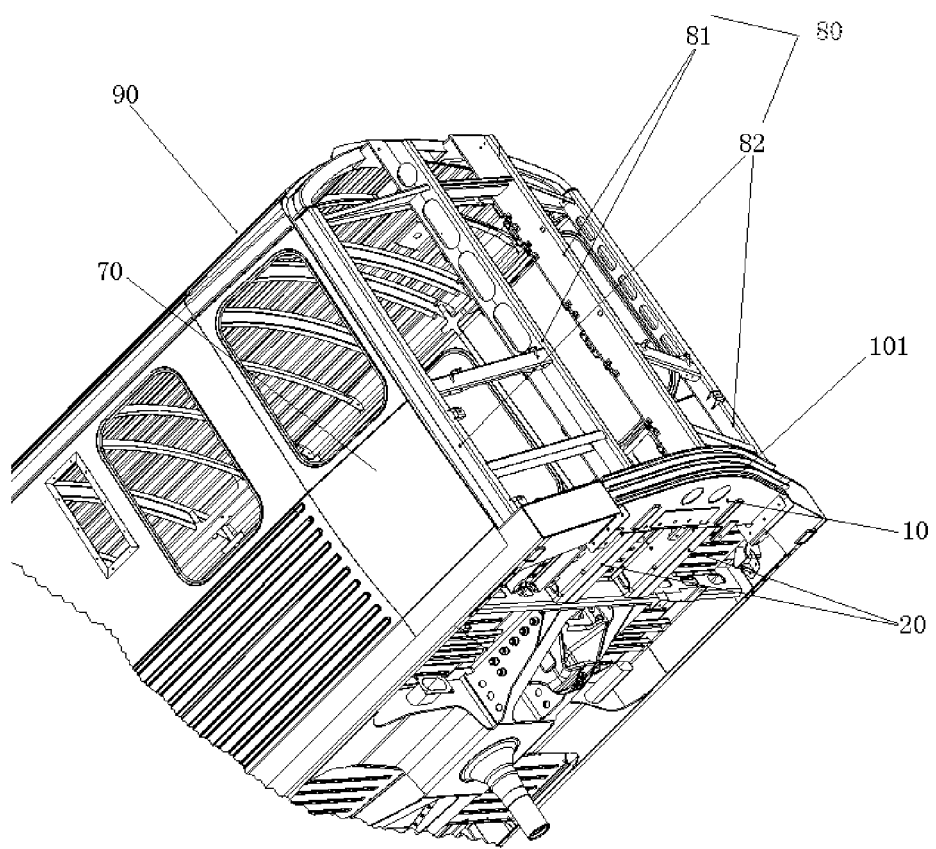
FIG. 6 illustrates a second structure diagram of a collision energy absorption structure according to the present invention.

As shown in FIG. 6, in the present embodiment, the end energy absorption structure 80 includes a first energy absorption cylinder 81, the middle of the end beam bottom plate 111 is provided with a first cylinder mounting hole 111*a*, and the first energy absorption cylinder 81 penetrates into the first cylinder mounting hole 111*a* and is welded to the end beam bottom plate 111. This design of providing the first cylinder mounting hole 111*a* in the middle of the end beam bottom plate 111 enables the first energy absorption cylinder 81 to penetrate through the first cylinder mounting hole 111*a* to be welded to the end beam bottom plate 111, and enhances the connecting strength between the end energy absorption cylinder and the end beam 11, thus improving the connecting strength of an end skeleton of the rail vehicle, and protecting the personal safety of a passenger.

As an optional example, the end beam bottom plate 111 includes a first bottom plate and a second bottom plate, the middle of the first bottom plate is provided with a third cylinder mounting hole, the middle of the second bottom plate is provided with a fourth cylinder mounting hole, and the first energy absorption cylinder penetrates through the third cylinder mounting hole and the fourth cylinder mounting hole and is welded to the first bottom plate and the second bottom plate respectively. This design not only enables the first bottom plate and the second bottom plate to be welded to the first energy absorption cylinder, but also increases the connecting stability of the vehicle end skeleton. Moreover, since a certain height difference is provided between the first bottom plate and the second bottom plate, the degree of inclining the first energy absorption cylinder into a carriage may be limited, so as to protect the personal safety of a passenger. It is to be noted that the first cylinder mounting hole 111*a* includes a third cylinder mounting hole and a fourth cylinder mounting hole.

As shown in FIG. 6, the end energy absorption structure 80 further includes a second energy absorption cylinder 82, having a first end welded to the roof structure 90 and a second end welded to the primary energy absorption structure 10.

In an embodiment of the present invention, two second energy absorption cylinders 82 are designed, the two second energy absorption cylinders 82 are spaced, and the second energy absorption cylinders 82 are welded to a side wall 70 of the rail vehicle. The above design enhances the connecting strength between the roof structure 90 of the rail vehicle and the chassis of the rail vehicle, and the design of welding the second energy absorption cylinders 82 to the side wall 70 of the rail vehicle improves the integrity of the vehicle end skeleton structure, so that when the vehicle end skeleton structure is collided and extruded, more components of the rail vehicle provide an anti-collision support. The design of spacing two energy absorption cylinders improves the balance of a connecting relationship between the roof structure 90 and the chassis structure, and avoids the distortion and deformation of the vehicle end skeleton structure at a weak part of the connecting relationship caused by the unbalanced connecting relationship between the roof structure 90 and the chassis structure.

As another optional example, as shown in FIG. 6, there are two second energy absorption cylinders 82, the two second energy absorption cylinders 82 are spaced, there are two first energy absorption cylinders 81, and the two first energy absorption cylinders 81 are located between the two second energy absorption cylinders 82. The example is obtained based on statistic analysis of a great number of experimental data. The number and position of the first energy absorption cylinder 81 in the example and the number and position of the second energy absorption cylinder 82 in the example are stably balanced, that is, a balance between the weight and connecting strength of the end energy absorption structure 80 is achieved, and a balance between the position design and connecting stability of the end energy absorption structure 80 is achieved.

Preferably, two ends of the end beam bottom plate 111 are separately provided with a second cylinder mounting hole 111*c*, and the second energy absorption cylinder 82 penetrates into the second cylinder mounting hole 111*c* and is welded to the end beam bottom plate 111. This design of providing the second cylinder mounting hole 111*c* in the middle of the end beam bottom plate 111 enables the second energy absorption cylinder 82 to penetrate through the second cylinder mounting hole 111*c* to be welded to the end beam bottom plate 111, and enhances the connecting strength between the second cylinder mounting hole 111*c* and the end beam bottom plate 111, thus improving the connecting strength of an end skeleton of the rail vehicle, and protecting the personal safety of a passenger.

In an example, the first energy absorption cylinder 81 is a collision cylinder, and the second energy absorption cylinder 82 is an end corner post. The collision cylinder and the end corner post form a protection structure of a vehicle front end, so as to protect the life safety of a crew member and a passenger in the vehicle. The four cylinders are of a closed tubular structure, and the size of the section needs to meet the requirements. The collision cylinder and the end corner post form an integrated structure with a roof bending beam on a roof and the end beam 11 at the vehicle front end. The side wall 70 of the remaining vehicle body and the roof structure 90 are welded together to form a whole.

Then, the collision energy absorption structure further includes a secondary energy absorption structure 20, the secondary energy absorption structure 20 being connected to the primary energy absorption structure 10, the secondary energy absorption structure 20 including at least two spaced energy absorption tubes 21, and the primary energy absorption structure 10 being connected to a first end of the energy absorption tube 21. The secondary energy absorption structure 20 is then described.

This design of providing the energy absorption cavity of the primary energy absorption structure 10 and the energy absorption tube 21 of the secondary energy absorption structure 20 at the end of the rail vehicle at least forms double energy absorption guarantee for the end of the rail vehicle. That is, at least two spaced energy absorption cavities of the primary energy absorption structure 10 and the energy absorption tube 21 of the secondary energy absorption structure 20 may absorb a certain collision energy to cause energy absorption deformation, thus improving the collision performance of the rail vehicle, and ensuring the personal safety of a passenger. In addition, if the vehicle is collided, since the energy absorption structure is disposed stage by stage, each stage of energy absorption structure will be deformed stage by stage, so that the deformation of the energy absorption structure is within a controllable range, thus avoiding from affecting the safety of people in the vehicle due to non-controllable deformation caused by the train structure.

The energy absorption tube 21 is set as a hollow structure, and the energy absorption tube 21 is provided with a first induction portion 213. The structure of the energy absorption tube is simple, and since the first induction portion 213 is provided, the part, in the first induction portion 213, of the energy absorption tube 21 is first deformed when the collision occurs, so that the deformation of the energy absorption tube 21 is in a controllable state, thus avoiding from threatening the personal safety of people in the vehicle due to non-controllable deformation of other parts of a rail train. Therefore, the present invention improves the anti-collision performance of the collision energy absorption structure. Preferably, the energy absorption tube 21 is symmetrically disposed along the vehicle width direction, and the energy absorption tube 21 is a thin-wall tube provided with an induction hole 211, thus facilitating deformation control of the energy absorption tube 21. The energy absorption tube 21 is connected to the second edge vertical plate 112*b* and a cross beam of a traction beam 50 in a welding manner.

Figure 7:
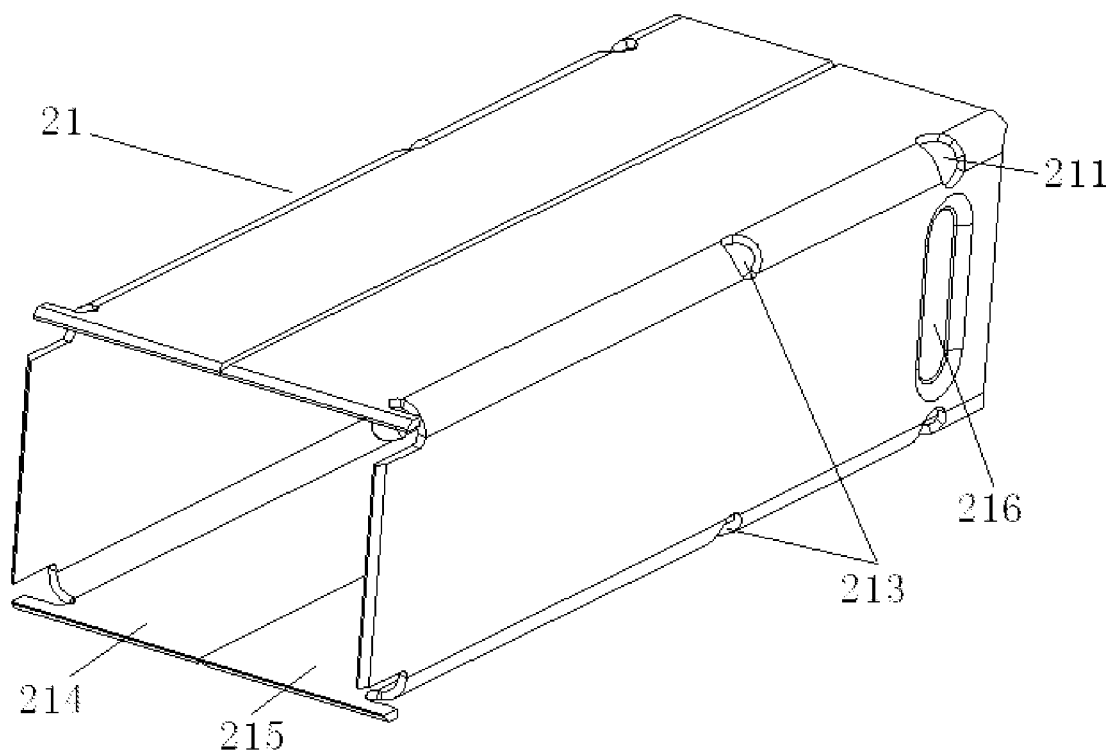
FIG. 7 illustrates a stereogram of an energy absorption tube of a collision energy absorption structure according to the present invention.

According to an embodiment of the present invention, as shown in FIG. 7, the energy absorption tube 21 includes a first tube body portion 214 and a second tube body portion 215, the first tube body portion 214 and the second tube body portion 215 being spliced. The two tube body portions are spliced to form the energy absorption tube 21 having a cavity, and during processing, the first tube body portion 214 and the second tube body portion 215 are spliced and welded at the spliced part. This structural form is simple in structure, and facilitates modular design, so that the cost can be reduced, and the processing efficiency is improved.

Specifically, the first tube body portion 214 is a U-shaped structure, the first tube body portion 214 includes a first bottom wall and two first side walls, the second tube body portion 215 is a U-shaped structure, the second tube body portion 215 includes a second bottom wall and two second side walls, and the two first side walls are butted with the two second side walls respectively.

In the present embodiment, the first tube body portion 214 and the second tube body portion 215 are U-shaped structures and are symmetrically disposed. The two side walls of the first tube body portion 214 and the second tube body portion 215 are butted in a one-to-one correspondence manner. Such design forms a flat plane at a to-be-welded part, facilitates the welding process, and improves the production efficiency. The first tube body portion 214 and the second tube body portion 215, which are symmetrically disposed, have the same structure, thereby facilitating batch production, and reducing the cost.

In the present invention, as shown in FIG. 7, the energy absorption tube 21 includes at least two adjacent side walls, the two adjacent side walls are connected to form a bending portion, and the first induction portion 213 is disposed on at least one bending portion of the energy absorption tube 21. The bending portion of the energy absorption tube 21 is provided with the first induction portion 213 to form a collision induction structure. When the rail train is collided, the first induction portion 213 on the energy absorption tube 21 will be deformed prior to the integrated structure, so that the deformation of the energy absorption tube 21 is controllable, thus avoiding from threatening the personal safety of people in the vehicle due to non-controllable deformation of other parts of a rail train. The first induction portion 213 is disposed at the bending part, which is easy to process, so that the production efficiency can be improved. Preferably, the cross section of the energy absorption tube 21 in the present embodiment is rectangular, the rectangular energy absorption tube 21 has a good torsional property, and the safety of the collision energy absorption structure can be further improved.

Figure 8:
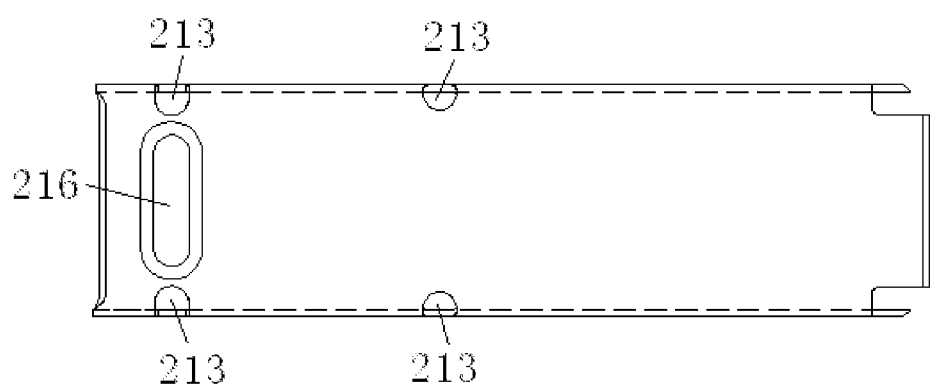
FIG. 8 illustrates a front view of an energy absorption tube of a collision energy absorption structure according to the present invention.
Figure 9:
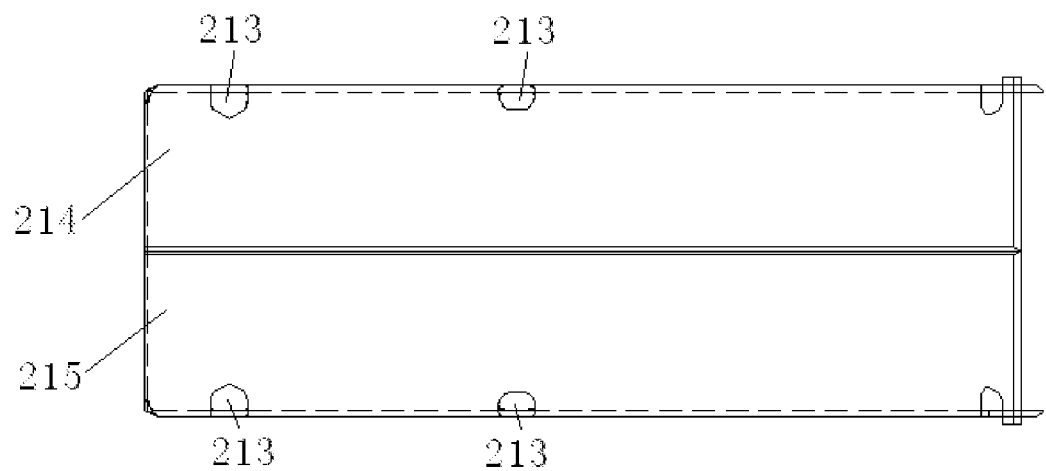
FIG. 9 illustrates a top view of an energy absorption tube of a collision energy absorption structure according to the present invention.

In the present embodiment, preferably, as shown in FIG. 7, FIG. 8 and FIG. 9, the first induction portion 213 includes an induction hole 211, the induction hole 211 being a through hole. The induction hole 211 is a through hole, which is easy to process.

As shown in FIG. 7, FIG. 8 and FIG. 9, the first induction portion 213 includes at least one group of induction holes 211, and each group of induction holes 211 is spaced in the circumferential direction of the energy absorption tube 21 along a plane vertical to the axis of the energy absorption tube 21.

Multiple induction holes 211 are spaced on the energy absorption tube 21 along each plane vertical to the axis of the energy absorption tube 21, and the multiple induction holes 211 are uniformly distributed along the circumferential direction of the energy absorption tube 21. When the collision occurs, the induction holes 211 uniformly distributed in the circumferential direction of the energy absorption tube 21 make the energy absorption tube 21 folded basically along a plane, so that the deformation is more controllable.

In a preferred example, the first induction portion 213 includes multiple groups of induction holes 211, the multiple groups of induction holes 211 being spaced along an extending direction of the energy absorption tube 21.

The multiple groups of induction holes 211 are spaced on the energy absorption tube 21. When the collision occurs, deformation is performed once at each group of induction holes 211. By providing the multiple groups of induction holes 211, the energy absorption tube 21 may be deformed repeatedly, thus improving the energy absorption capability of the energy absorption tube 21.

Figure 10:
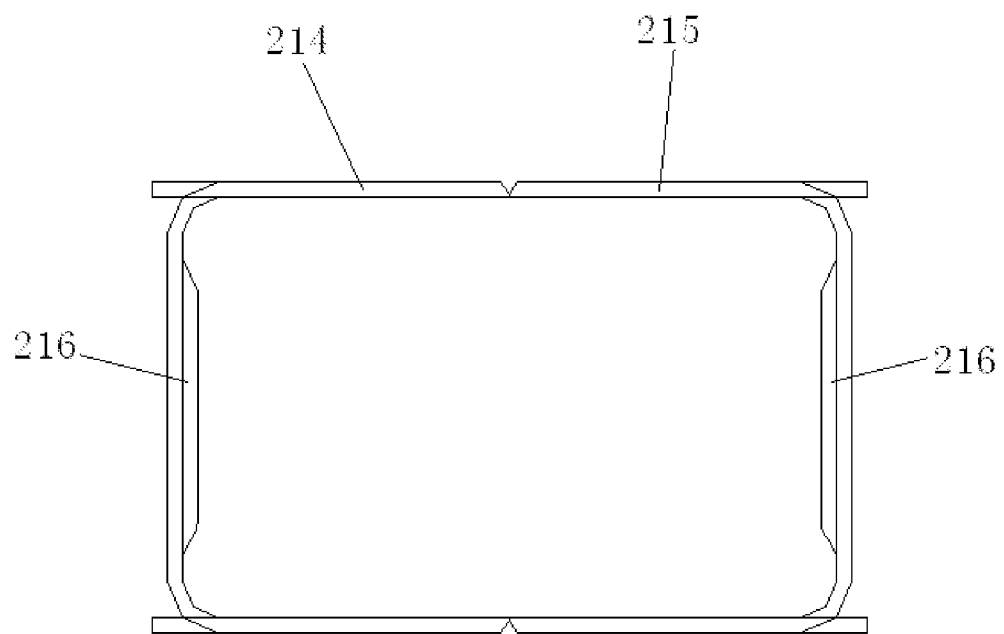
FIG. 10 illustrates a sectional view of an energy absorption tube of a collision energy absorption structure according to the present invention.

As shown in FIG. 7, FIG. 8 and FIG. 10, the energy absorption tube 21 is further provided with a second induction portion 216, the second induction portion 216 being disposed on the side wall of the energy absorption tube 21. Preferably, in the present embodiment, the second induction portion 216 is depressed into the side wall of the energy absorption tube 21 to form a depression portion 212.

As shown in FIG. 7 and FIG. 8, in an embodiment, the axes of the first induction portion 213 and the second induction portion 216 are on the same plane vertical to the extending direction of the energy absorption tube 21. On the basis of the first induction portion 213, the provision of the second induction portion 216 facilitates the formation of a weaker induction part at this part, so that this part may be deformed prior to other parts.

As shown in FIG. 10, in an embodiment, the cross section of the energy absorption tube 21 is rectangular, there are two second induction portions 216, and the two second induction portions 216 are disposed on the side wall of the energy absorption tube 21 oppositely. The first tube body portion 214 is a U-shaped structure, and the first tube body portion 214 includes a first bottom wall and two first side walls. The second tube body portion 215 is a U-shaped structure, and the second tube body portion 215 includes a second bottom wall and two second side walls. The two first side walls are butted with the two second side walls respectively, and the second induction portion 216 is disposed on the first bottom wall and the second bottom wall respectively.

Preferably, the second induction portion 216 is a groove depressed into the energy absorption tube 21, the bottom wall of the groove is parallel to the side wall of the energy absorption tube 21, and the side wall of the groove is an inclined surface, and the cross section of the groove is trapezoidal.

Finally, the collision energy absorption structure further includes a tertiary energy absorption structure 30. The tertiary energy absorption structure 30 is described hereinafter.

Figure 2:
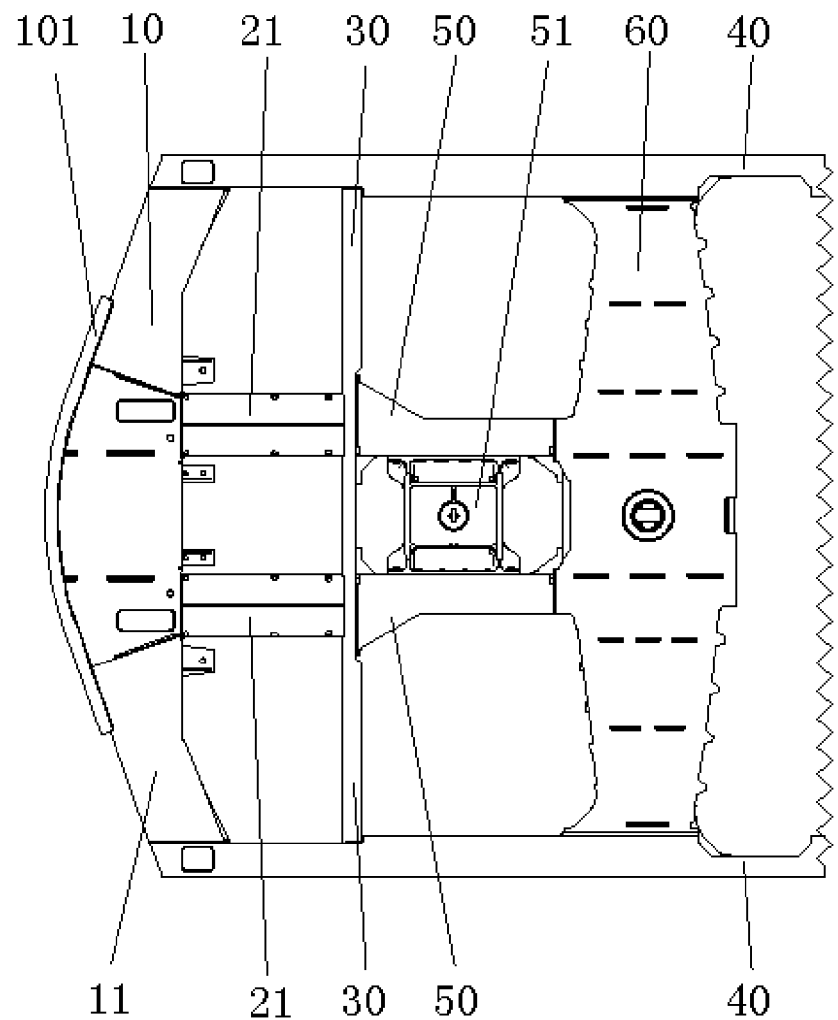
FIG. 2 illustrates a top view of a first end of a collision energy absorption structure according to the present invention.
Figure 3:
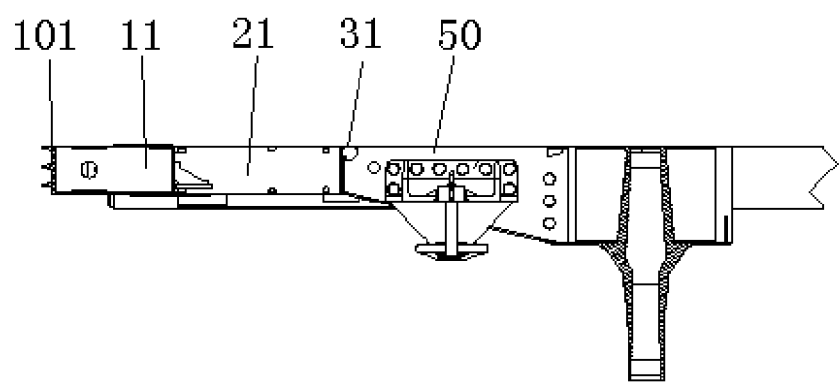
FIG. 3 illustrates a side view of a first end of a collision energy absorption structure according to the present invention.
Figure 4:
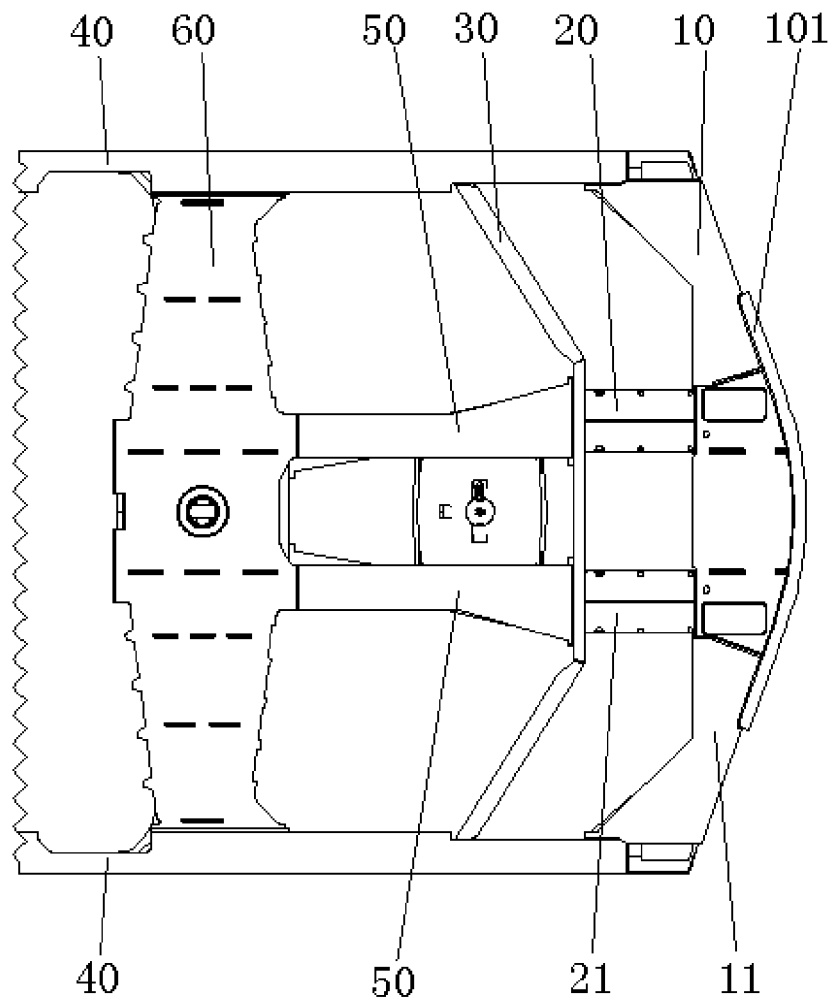
FIG. 4 illustrates a top view of a second end of a collision energy absorption structure according to the present invention.
Figure 5:
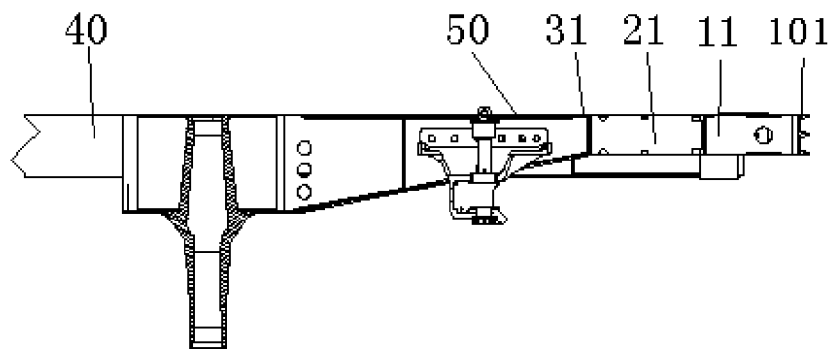
FIG. 5 illustrates a side view of a second end of a collision energy absorption structure according to the present invention.

As shown in FIG. 1, FIG. 2 and FIG. 4, in the present embodiment, the tertiary energy absorption structure 30 is connected to the second end of the energy absorption tube 21. Specifically, the tertiary energy absorption structure 30 includes a stopping beam 31, two ends of the stopping beam 31 are connected to the chassis boundary beam 40 of the rail vehicle respectively, and the second end of the energy absorption tube 21 is connected to the stopping beam 31. Such design increases the connecting strength of the energy absorption tube 21. That is, the energy absorption tube 21 forms an indirect connecting relationship with the chassis boundary beam 40 through the stopping beam, thereby avoiding the situation that controllable deformation cannot be performed due to unbalanced stress caused by the position offset of the energy absorption tube 21 when being collided. In addition, this design also increases the collision performance of the rail vehicle. That is, when the rail vehicle is collided, the stopping beam can provide a support against the collision, so as to reduce the degree of deformation of the rail vehicle. Further, the stopping beam is subjected to energy absorption deformation to absorb certain collision energy.

In addition, in the present embodiment, the stopping beam 31 is a cross beam having a U-shaped section. This design makes the stopping beam unlikely to deform, that is, the stopping beam 31 having the U-shaped section may bear a larger collision force without deformation. It is to be noted that the direction of the collision force may be the running direction of the rail vehicle, or may be the vehicle width direction of the rail vehicle.

As an optional example, specifically as shown in FIG. 1 and FIG. 4, the stopping beam 31 includes a first stopping segment, a second stopping segment and a third stopping segment connected in sequence, the second end of the energy absorption tube 21 is welded to the second stopping segment, a first included angle is provided between the first stopping segment and the second stopping segment, the first included angle is an obtuse angle, a second included angle is provided between the third stopping segment and the second stopping segment, and the first included angle is equal to the second included angle.

As another optional example, specifically as shown in FIG. 1 and FIG. 2, the stopping beam includes a fourth stopping segment, a fifth stopping segment and a sixth stopping segment connected in sequence, and the second end of the energy absorption tube 21 is welded to the second stopping segment. The length of the side surface of the fourth stopping segment is the same as the length of the side surface of the sixth stopping segment, the length of the side surface of the fifth stopping segment is smaller than the length of the side surface of the stopping segment, and the length of the side surface of the stopping beam is based on the running direction of the rail vehicle.

It is to be noted that the other surface of the second stopping segment is also welded to first ends of two traction beams 50, and second ends of the two traction beams 50 are welded to a sleeper beam 60, wherein a vehicle hook mounting seat 51 is also disposed between the two traction beams 50, the stopping beam and the sleeper beam 60.

The tertiary energy absorption structure 30 may also be adjusted in various manners. As an optional example, the first stopping segment is provided with multiple spaced second weight-reducing holes, wherein the second weight-reducing holes are used for reducing the weight of the rail vehicle or the collision energy absorption structure. Similarly, as another optional example, the third stopping segment is provided with multiple spaced third weight-reducing holes, wherein the third weight-reducing holes are used for reducing the weight of the rail vehicle or the collision energy absorption structure.

Further, the outer contour of the tertiary energy absorption structure 30 may be changed as required. For example, the stopping beam 31 is lengthened, and the stopping beam 31 is widened.

A preferred embodiment is then provided for further description.

1. When two adjacent vehicles collide, anti-creeping teeth 101 are touched, and the anti-creeping teeth 101 are welded to primary energy absorption structures 10 and protrude from the primary energy absorption structures 10. The height and tooth number of the anti-creeping teeth 101 of the two vehicles are consistent, so that when the collision occurs, the end beam 11 ensures engagement of at least one anti-creeping tooth of the energy absorption beam, and the vehicles will not mismatch in the height direction.

2. When the collision is more severe, the primary energy absorption structure 10 formed by welding the first bottom plate and the second bottom plate of the end beam bottom plate 111 and the end beam vertical plate 112 connected to the end beam bottom plate 111 is locally deformed to absorb a part of energy. Moreover, the collision cylinder welded to the end beam 11 and serving as the first energy absorption cylinder 81 and the end corner post serving as the second energy absorption cylinder 82 are always connected to the end beam 11.

3. When the collision is more severe, the secondary energy absorption structure 20 is induced by the first induction portion 213 and the second induction portion 216 to be deformed to absorb energy. Moreover, the end corner post, the end beam 11 and the secondary energy absorption structure 20 are always connected together, thus ensuring the safety of people behind the collision cylinder and the end corner post.

4. After the energy absorption tube 21 absorbs energy to complete deformation, the front end is deformed, collision cylinders of the two vehicles are touched and collided to be deformed to absorb energy, and the energy absorption space of an end area is used completely. The roof structure 90, the side wall 70 and the chassis connected together with the vehicle front end are locally deformed, and the collision energy absorption of the vehicle is completed.

5. After the deformation of collision energy absorption is completed, the roof structure 90, the side wall 70 and the chassis connected together with the vehicle front end are locally deformed, but not separated.

Another embodiment of the present invention provides a rail vehicle. The rail vehicle includes a collision energy absorption structure, wherein the collision energy absorption structure is the above collision energy absorption structure. The collision energy absorption structure of the solution is not only an energy absorption member, but also a load carrying structure.

The primary energy absorption structure 10 on an end chassis, the roof structure 90 and the end energy absorption structure 80 mounted between the roof structure 90 and the primary energy absorption structure 10 form an end integrated energy absorption structure of a vehicle body structure, and an independent energy absorption structure element is no longer needed. The present invention improves the collision energy absorption performance of a vehicle without increasing the external dimension of the vehicle body structure, and meets the requirements for collision energy absorption of a vehicle body structure. In addition, since the external dimension of the vehicle body structure does not need to be changed, the dimension of the vehicle can be consistent with the existing vehicle, so that the requirements for a vehicle compatible with couplings can be met, and the compatibility of the vehicle is improved. Since the external dimension of the vehicle is not increased, the collision energy absorption structure of the present invention can meet the technical requirements of small gap between vehicle end couplings and small curve negotiation and can adapt to more complex road conditions.

The above is only the preferred embodiments of the present invention, not intended to limit the present invention. As will occur to those skilled in the art, the present invention is susceptible to various modifications and changes. Any modifications, equivalent replacements, improvements and the like made within the spirit and principle of the present invention shall fall within the scope of protection of the present invention.

It is to be noted that terms used herein only aim to describe specific implementation manners, and are not intended to limit exemplar implementations of this application. Unless otherwise directed by the context, singular forms of terms used herein are intended to include plural forms. Besides, it will be also appreciated that when terms "contain" and/or "include" are used in the description, it is indicated that features, steps, operations, devices, assemblies and/or a combination thereof exist.

Unless otherwise specified, relative arrangements of components and steps elaborated in these embodiments, numeric expressions and numeric values do not limit the scope of the present invention. Furthermore, it should be understood that for ease of descriptions, the size of each part shown in the drawings is not drawn in accordance with an actual proportional relation. Technologies, methods and devices known by those skilled in the related art may not be discussed in detail. However, where appropriate, the technologies, the methods and the devices shall be regarded as part of the authorized description. In all examples shown and discussed herein, any specific values shall be interpreted as only exemplar values instead of limited values. As a result, other examples of the exemplar embodiments may have different values. It is to be noted that similar marks and letters represent similar items in the following drawings. As a result, once a certain item is defined in one drawing, it is unnecessary to further discus the certain item in the subsequent drawings.

In the descriptions of the present invention, it will be appreciated that locative or positional relations indicated by "front, back, up, down, left, and right", "horizontal, vertical, perpendicular, and horizontal", "top and bottom" and other terms are locative or positional relations shown on the basis of the drawings, which are only intended to make it convenient to describe the present invention and to simplify the descriptions without indicating or impliedly indicating that the referring device or element must have a specific location and must be constructed and operated with the specific location, and accordingly it cannot be understood as limitations to the present invention. The nouns of locality "inner and outer" refer to the inner and outer contours of each component.

For ease of description, spatial relative terms such as "over", "above", "on an upper surface" and "upper" may be used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" may include two orientations namely "above" and "below". The device may be located in other different modes (rotated by 90 degrees or located in other orientations), and spatial relative descriptions used herein are correspondingly explained.

In addition, it is to be noted those terms such as "first" and "second" are used to limit parts, so as only to distinguish the corresponding parts. Unless otherwise stated, the above terms do not have special meanings, and therefore it cannot be interpreted as limitation to the scope of protection of the present invention.

What is claimed is:

1. A collision energy absorption structure of a rail vehicle, comprising:
   a primary energy absorption structure (10), connected to a chassis boundary beam (40) of a vehicle, the primary energy absorption structure (10) having at least two spaced energy absorption cavities;
   an end energy absorption structure (80), the lower end of the end energy absorption structure (80) being connected to the primary energy absorption structure (10); and
   a roof structure (90), the upper end of the end energy absorption structure (80) being connected to the roof structure (90);
   the primary energy absorption structure (10) comprises an end beam (11), two ends of the end beam (11) are connected to a chassis boundary beam (40) of the vehicle respectively, the end beam (11) has an end beam bottom plate (111) and an end beam vertical plate (112) connected to the end beam bottom plate (111), and the end beam vertical plate (112) is vertically disposed and defines the energy absorption cavity on the end beam bottom plate (111);
   wherein the end beam vertical plate (112) comprises a first edge vertical plate (112a), a second edge vertical plate (112b) and multiple middle vertical plates (112c), wherein the first edge vertical plate (112a) and the second edge vertical plate (112b) are spaced, two ends of the vertical plates (112c) are connected to the first edge vertical plate (112a) and the second edge vertical plate (112b) respectively, the multiple middle vertical plates (112c) are spaced, and multiple spaced energy absorption cavities are defined between the first edge vertical plate (112a) and the second edge vertical plate (112b).

2. The collision energy absorption structure as claimed in claim 1, wherein the end energy absorption structure (80) comprises a first energy absorption cylinder (81), the middle of the end beam bottom plate (111) is provided with a first cylinder mounting hole (111a), and the first energy absorption cylinder (81) penetrates into the first cylinder mounting hole (111a) and is welded to the end beam bottom plate (111).

3. The collision energy absorption structure as claimed in claim 2, wherein the end beam bottom plate (111) comprises a first bottom plate and a second bottom plate disposed oppositely, and the first energy absorption cylinder (81) is welded to the first bottom plate and the second bottom plate respectively.

4. The collision energy absorption structure as claimed in claim 2, wherein the end energy absorption structure (80) further comprises a second energy absorption cylinder (82), having a first end welded to the roof structure (90) and a second end welded to the primary energy absorption structure (10).

5. The collision energy absorption structure as claimed in claim 4, wherein there are two second energy absorption cylinders (82), the two second energy absorption cylinders (82) being spaced; and there are two first energy absorption cylinders (81), the two first energy absorption cylinders (81) being spaced, and the two first energy absorption cylinders (81) being located between the two second energy absorption cylinders (82).

6. The collision energy absorption structure as claimed in claim 5, wherein two ends of the end beam bottom plate (111) are separately provided with a second cylinder mounting hole (111c), and the second energy absorption cylinder (82) penetrates into the second cylinder mounting hole (111c) and is welded to the end beam bottom plate (111).

7. The collision energy absorption structure as claimed in claim 1, further comprising:
   a secondary energy absorption structure (20), the secondary energy absorption structure (20) being connected to the primary energy absorption structure (10), the secondary energy absorption structure (20) comprising at least two spaced energy absorption tubes (21), and the primary energy absorption structure (10) being connected to a first end of the energy absorption tube (21).

8. The collision energy absorption structure as claimed in claim 7, wherein the energy absorption tube (21) is a hollow structure, the energy absorption tube (21) is provided with a first induction portion (213), the first induction portion (213) comprises an induction hole (211), and the induction hole (211) is a through hole.

9. The collision energy absorption structure as claimed in claim 8, wherein the cross section of the energy absorption tube (21) is rectangular, the first induction portion (213) comprises at least one group of induction holes (211), and the induction holes (211) of each group is spaced in the circumferential direction of the energy absorption tube (21) along a plane vertical to the axis of the energy absorption tube (21).

10. The collision energy absorption structure as claimed in claim 9, wherein the first induction portion (213) comprises a plurality of groups of induction holes (211), the plurality of groups of induction holes (211) being spaced along an extending direction of the energy absorption tube (21).

11. The collision energy absorption structure as claimed in claim 8, wherein the energy absorption tube (21) comprises at least two adjacent side walls, the two adjacent side walls are connected to form a bending portion, and the first induction portion (213) is disposed on at least one bending portion of the energy absorption tube (21).

12. The collision energy absorption structure as claimed in claim 8, wherein the energy absorption tube (21) is also provided with a second induction portion (216), the second induction portion (216) being disposed on a side wall of the energy absorption tube (21).

13. The collision energy absorption structure as claimed in claim 12, wherein the second induction portion (216) is depressed into the side wall of the energy absorption tube (21) to form a depression portion (212).

14. The collision energy absorption structure as claimed in claim 13, wherein the cross section of the energy absorption tube (21) is rectangular, there are two second induction portions (216), and the two second induction portions (216) are disposed on the side walls of the energy absorption tube (21) oppositely.

15. The collision energy absorption structure as claimed in claim 7, further comprising a tertiary energy absorption structure (30), wherein the tertiary energy absorption structure (30) is connected to a second end of the energy absorption tube (21), the tertiary energy absorption structure (30) comprises a stopping beam (31), and two ends of the stopping beam (31) are connected to the chassis boundary beam (40) of the rail vehicle respectively.

16. The collision energy absorption structure as claimed in claim 15, wherein the second end of the energy absorption tube (21) is connected to the stopping beam (31).

17. The collision energy absorption structure as claimed in claim 15, wherein the stopping beam (31) comprises a first stopping segment, a second stopping segment and a third stopping segment connected in sequence, the second end of the energy absorption tube (21) is welded to the second stopping segment, a first included angle is provided between the first stopping segment and the second stopping segment, the first included angle is an obtuse angle, a second included angle is provided between the third stopping segment and the second stopping segment, and the first included angle is equal to the second included angle.

18. The collision energy absorption structure as claimed in claim 17, wherein the first stopping segment is provided with a plurality of spaced second weight-reducing holes; and/or, the third stopping segment is provided with a plurality of spaced third weight-reducing holes.

19. A rail vehicle, comprising a collision energy absorption structure, wherein the collision energy absorption structure is the collision energy absorption structure as claimed in claim 1.

* * * * *